(12) United States Patent
Osasa et al.

(10) Patent No.: US 10,847,761 B2
(45) Date of Patent: Nov. 24, 2020

(54) RECTANGULAR SECONDARY BATTERY AND ASSEMBLED BATTERY USING THE RECTANGULAR SECONDARY BATTERY

(71) Applicant: SANYO Electric Co., Ltd., Osaka (JP)

(72) Inventors: Takefumi Osasa, Hyogo (JP); Atsushi Tsuji, Hyogo (JP); Yoshinori Ikeuchi, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 153 days.

(21) Appl. No.: 16/044,110

(22) Filed: Jul. 24, 2018

(65) Prior Publication Data

US 2019/0036087 A1    Jan. 31, 2019

(30) Foreign Application Priority Data

Jul. 31, 2017    (JP) ................ 2017-147416

(51) Int. Cl.
*H01M 2/02*    (2006.01)
*H01M 2/12*    (2006.01)
*H01M 2/04*    (2006.01)
*H01M 10/02*    (2006.01)
*H01M 10/42*    (2006.01)
*H01M 2/10*    (2006.01)

(52) U.S. Cl.
CPC .......... *H01M 2/024* (2013.01); *H01M 2/043* (2013.01); *H01M 2/0473* (2013.01); *H01M 2/1077* (2013.01); *H01M 2/12* (2013.01); *H01M 2/1223* (2013.01); *H01M 10/02* (2013.01); *H01M 10/4221* (2013.01); *H01M 2220/20* (2013.01)

(58) Field of Classification Search
CPC .... H01M 2/024; H01M 2/043; H01M 2/0469; H01M 2/0473; H01M 2/1077; H01M 2/12; H01M 2/1223; H01M 2/1241; H01M 2/22; H01M 2/305; H01M 2/34; H01M 10/02; H01M 10/04; H01M 10/058; H01M 10/28; H01M 10/4221; H01M 2220/20
See application file for complete search history.

(56) References Cited

U.S. PATENT DOCUMENTS

| 5,100,005 A * | 3/1992 | Noble ................. B07C 5/34 206/459.5 |
| 2004/0259277 A1* | 12/2004 | Hofmeister ........... H01L 23/544 438/14 |
| 2005/0080520 A1* | 4/2005 | Kline ................. B03B 9/06 701/1 |
| 2014/0255760 A1* | 9/2014 | Han ................... H01M 2/1077 429/157 |

FOREIGN PATENT DOCUMENTS

JP    2012-113854 A    6/2012

* cited by examiner

*Primary Examiner* — Anca Eoff
(74) *Attorney, Agent, or Firm* — Westerman, Hattori, Daniels & Adrian, LLP

(57)    ABSTRACT

A rectangular secondary battery includes a rectangular outer packaging body that has an opening; a sealing plate that seals the opening of the rectangular outer packaging body; and an electrode body that is arranged inside the rectangular outer packaging body and that includes a positive electrode plate and a negative electrode plate. A gas exhaust valve is formed at a center portion of the sealing plate in the longitudinal direction. In the longitudinal direction of the sealing plate, a first identification code is provided closer than the gas exhaust valve to one end portion of the sealing plate. In the longitudinal direction, a second identification code is provided closer than the gas exhaust valve to the other end portion of the sealing plate. The first identification code and the second identification code include identical information.

5 Claims, 10 Drawing Sheets

RECTANGULAR SECONDARY BATTERY AND ASSEMBLED BATTERY USING THE RECTANGULAR SECONDARY BATTERY

CROSS REFERENCE TO RELATED APPLICATIONS

The present invention application claims priority to Japanese Patent Application No. 2017-147416 filed in the Japan Patent Office on Jul. 31, 2017, the entire contents of which are incorporated herein by reference.

BACKGROUND OF THE INVENTION

Field of the Invention

The present disclosure relates to a rectangular secondary battery and an assembled battery using the rectangular secondary battery.

Description of Related Art

In driving power sources for electric vehicles (EV), hybrid electric vehicles (BEV, PHEV), and the like, rectangular secondary batteries such as alkaline secondary batteries and non-aqueous electrolyte secondary batteries are used.

In such a rectangular secondary battery, a battery case is constituted by a rectangular outer packaging body that has an opening and that has a bottomed rectangular cylindrical shape and a sealing plate that seals the opening. Inside the battery case, an electrode body that is constituted by a positive electrode plate, a negative electrode plate, and a separator is housed together with an electrolytic solution. A positive electrode terminal and a negative electrode terminal are attached to the sealing plate. The positive electrode terminal is electrically coupled to the positive electrode plate via a positive electrode current collector, and the negative electrode terminal is electrically coupled to the negative electrode plate via a negative electrode current collector.

The positive electrode plate includes a positive electrode core body made of metal and a positive-electrode-active-material mixture layer formed on a surface of the positive electrode core body. A positive-electrode-core-body exposure portion in which no positive-electrode-active-material mixture layer is formed is formed at a part of the positive electrode core body. The positive electrode current collector is coupled to the positive-electrode-core-body exposure portion. Meanwhile, the negative electrode plate includes a negative electrode core body made of metal and a negative-electrode-active-material mixture layer formed on a surface of the negative electrode core body. A negative-electrode-core-body exposure portion in which no negative-electrode-active-material mixture layer is formed is formed at a part of the negative electrode core body. The negative electrode current collector is coupled to the negative-electrode-core-body exposure portion.

It is conceivable that, in the rectangular secondary battery, the sealing plate that constitutes the battery case is provided with an identification code. In this case, it is possible to associate information included in the identification code with information relating to the performance of the rectangular secondary battery, information relating to the history of the manufacturing process of the rectangular secondary battery, and the like.

Consequently, it is possible to accurately manage and grasp the performance, the manufacturing history, and the like of the rectangular secondary battery (refer to Japanese Published Unexamined Patent Application No. 2012-113854 (Patent Document 1)).

BRIEF SUMMARY OF THE INVENTION

An object of the present disclosure is to provide a rectangular secondary battery in which the productivity is improved and the management is simplified and an assembled battery that uses the rectangular secondary battery.

A rectangular secondary battery according to one aspect of the present disclosure includes a rectangular outer packaging body that has an opening; a sealing plate that seals the opening; and an electrode body that is arranged inside the rectangular outer packaging body and that includes a positive electrode plate and a negative electrode plate. The sealing plate is provided with a gas exhaust valve. In a longitudinal direction of the sealing plate, a first identification code is provided closer than the gas exhaust valve to one end portion of the sealing plate. In the longitudinal direction of the sealing plate, a second identification code is provided closer than the gas exhaust valve to an other end portion of the sealing plate. The first identification code and the second identification code include identical information.

In the configuration of the rectangular secondary battery according to the one aspect of the present disclosure, the productivity is improved and the management is simplified in the rectangular secondary battery. In addition, using the rectangular secondary battery according to the one aspect of the present disclosure to form an assembled battery improves the productivity and simplifies the management in the assembled battery.

Typically, in a rectangular secondary battery, a gas exhaust valve is formed at a center portion of a sealing plate. Consequently, when an identification code is provided on the sealing plate, the position at which the identification code is provided is away from the center portion of the sealing plate. When an identification code is provided at such a position away from a center portion of a sealing plate, there is a possibility that a device such as an identification code reader that reads the identification code or an attaching device that attaches components to the sealing plate is needed to be moved, for example, in the manufacturing process of the rectangular secondary battery or in the manufacturing process of an assembled battery.

In contrast, the configuration of the rectangular secondary battery according to the one aspect of the present disclosure is capable of reducing the need to move a device such as an identification code reader that reads an identification code or an attaching device that attaches components to a sealing plate in, for example, the manufacturing process of the rectangular secondary battery or in the manufacturing process of an assembled battery. Accordingly, the productivity is improved and the management is simplified in the rectangular secondary battery and the assembled battery that uses the rectangular secondary battery.

The present disclosure provides a rectangular secondary battery in which the productivity is improved and the management is simplified and an assembled battery that uses the rectangular secondary battery.

DETAILED DESCRIPTION OF THE INVENTION

A configuration of a rectangular secondary battery 20 according to an embodiment will be described below. Note that the present disclosure is not limited to the following embodiment.

Figure 1:
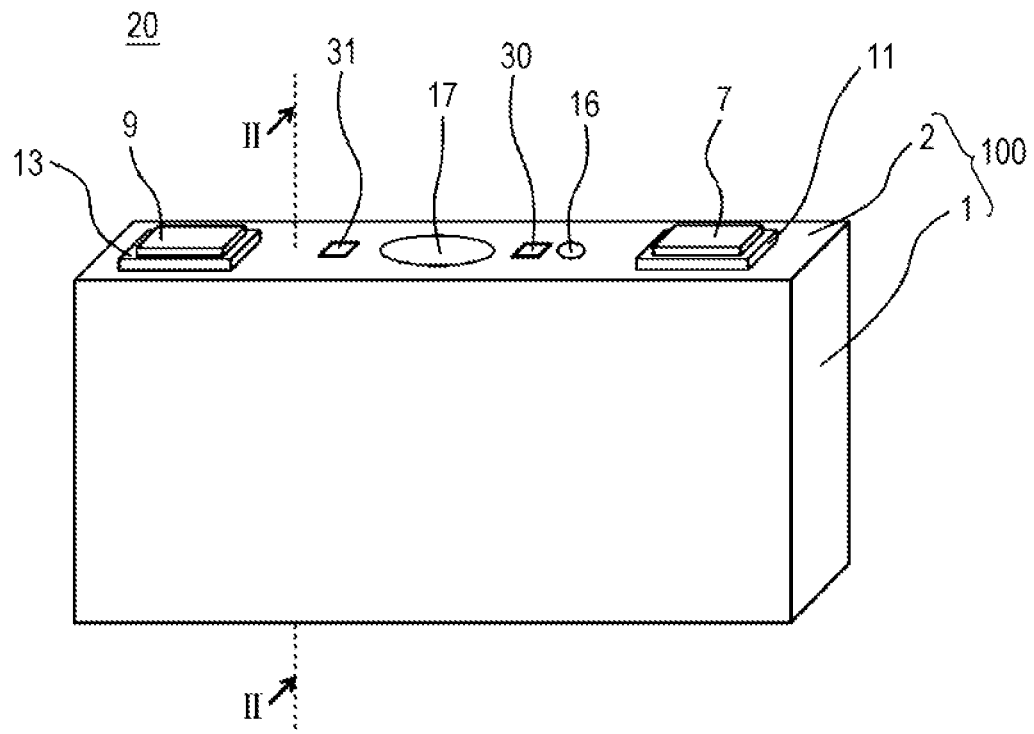
FIG. 1 is a perspective view of a rectangular secondary battery according to an embodiment.
Figure 2:
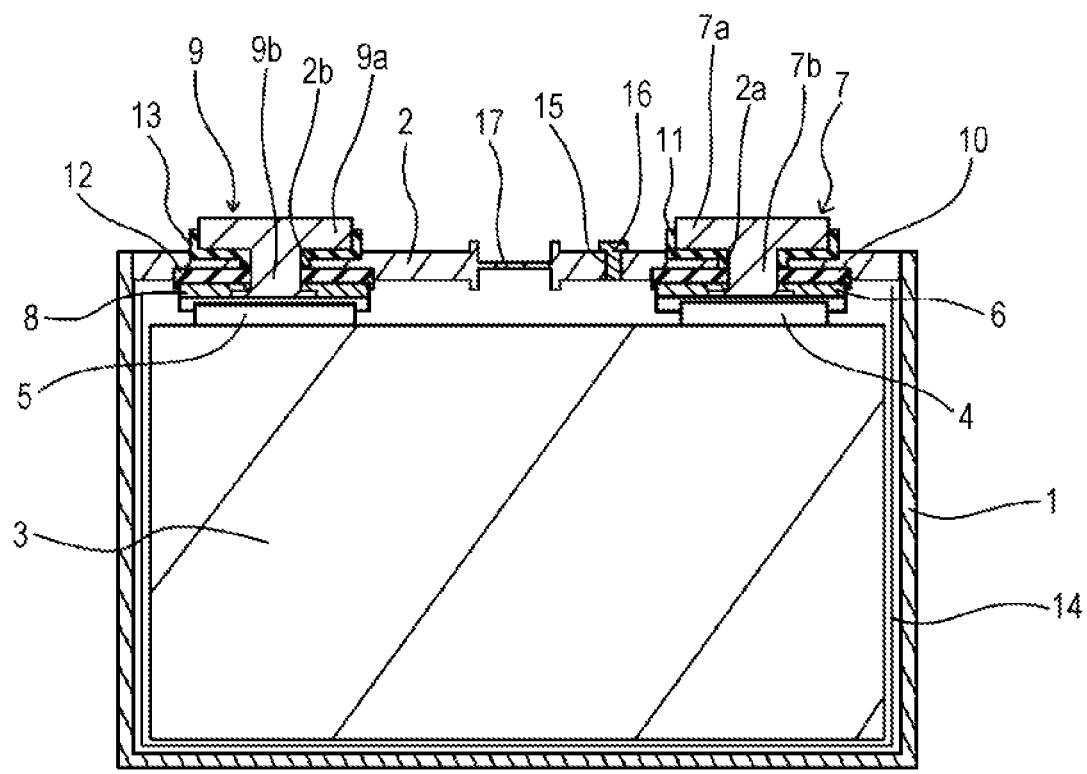
FIG. 2 is a sectional view taken along line II-II in FIG. 1.

As shown in FIGS. 1 and 2, the rectangular secondary battery 20 includes a battery case 100 that is constituted by a rectangular outer packaging body 1 that has an opening and that has a bottomed rectangular cylindrical shape and a sealing plate 2 that seals the opening of the rectangular outer packaging body 1. Each of the rectangular outer packaging body 1 and the sealing plate 2 is preferably made of metal and preferably made of, for example, aluminum or an aluminum alloy. Inside the rectangular outer packaging body 1, an electrode body 3 that includes a positive electrode plate, a negative electrode plate, and a separator is housed together with an electrolytic solution. An insulation sheet 14 is arranged between the electrode body 3 and the rectangular outer packaging body 1.

The positive electrode plate includes a positive-electrode-active-material mixture layer that is formed on each of both surfaces of a metal foil as a positive electrode core body. The positive-electrode-active-material mixture layer contains a positive electrode active material. The negative electrode plate includes a negative-electrode-active-material mixture layer that is formed on each of both surfaces of a metal foil as a negative electrode core body. The negative-electrode-active-material mixture layer contains a negative electrode active material. A separator that is constituted by a porous film is arranged between the positive electrode plate and the negative electrode plate. Note that the electrode body 3 may be a stacked electrode body including a plurality of positive electrode plates and a plurality of negative electrode plates that are stacked on each other. In addition, the electrode body 3 may be a wound electrode body including a belt-shaped positive electrode plate and a belt-shaped negative electrode plate that are wound via a belt-shaped separator.

A positive electrode tab 4 coupled to the positive electrode plate and a negative electrode tab 5 coupled to the negative electrode plate are arranged at an end portion of the electrode body 3 on the side where the sealing plate 2 is present. The positive electrode tab 4 is preferably a portion of the positive electrode core body, and the negative electrode tab 5 is preferably a portion of the negative electrode core body. The positive electrode tab 4 is electrically coupled to a positive electrode terminal 7 via a positive electrode current collector 6. An inside insulation member 10 made of resin is arranged between the positive electrode current collector 6 and the sealing plate 2. An outside insulation member 11 made of resin is arranged between the positive electrode terminal 7 and the sealing plate 2. The negative electrode tab 5 is electrically coupled to a negative electrode terminal 9 via a negative electrode current collector 8. An inside insulation member 12 made of resin is arranged between the negative electrode current collector 8 and the sealing plate 2. An outside insulation member 13 made of resin is arranged between the negative electrode terminal 9 and the sealing plate 2.

The positive electrode terminal 7 includes a flange portion 7a and an insertion portion 7b. The insertion portion 7b of the positive electrode terminal 7 is inserted from the external side of the battery into a through hole of the outside insulation member 11, a positive-electrode-terminal attachment hole 2a of the sealing plate 2, a through hole of the inside insulation member 10, and a through hole of the positive electrode current collector 6. In addition, the leading end portion of the insertion portion 7b is caulked. Preferably, the caulked part of the insertion portion 7b is welded and coupled to the positive electrode current collector 6.

The negative electrode terminal 9 includes a flange portion 9a and an insertion portion 9b. The insertion portion 9b of the negative electrode terminal 9 is inserted from the external side of the battery into a through hole of the outside insulation member 13, a negative-electrode-terminal attachment hole 2b of the sealing plate 2, a through hole of the inside insulation member 12, and a through hole of the negative electrode current collector 8. In addition, the leading end portion of the insertion portion 9b is caulked. Preferably, the caulked part of the insertion portion 9b is welded and coupled to the negative electrode current collector 8.

The sealing plate 2 is provided with a liquid injection hole 15. The liquid injection hole 15 is sealed with a sealing plug 16 after the electrolytic solution is injected into the battery case 100 through the liquid injection hole 15. The sealing plate 2 is also provided with a gas exhaust valve 17 that breaks, when the pressure inside the battery case 100 is more than or equal to a predetermined value, to exhaust the gas inside the battery case 100 to outside the battery case 100.

The sealing plate 2 has a surface on the external side of the battery, the surface being provided with a first identification code 30 and a second identification code 31. The first identification code 30 and the second identification code 31 include identical information. In the longitudinal direction (left-right direction in FIG. 1) of the sealing plate 2, the gas exhaust valve 17 is arranged at a center portion of the sealing plate 2. In the longitudinal direction of the sealing plate 2, the first identification code 30 is arranged closer than the gas exhaust valve 17 to one end portion (right side in FIG. 1) of the sealing plate 2. In the longitudinal direction of the sealing plate 2, the second identification code 31 is arranged closer than the gas exhaust valve 17 to the other end portion (left side in FIG. 1) of the sealing plate 2.

For example, it is possible to specify specific characters, numbers, symbols, combinations thereof, and the like by reading the first identification code 30 or the second identification code 31 with an identification code reader. Then, it is possible to associate such pieces of information with information relating to the battery characteristics of the rectangular secondary battery and the manufacturing history of the rectangular secondary battery. Consequently, it is possible to check the information relating to the battery characteristics of the rectangular secondary battery and the manufacturing history of the rectangular secondary battery by reading the first identification code 30 or the second identification code 31.

Next, a method of manufacturing the rectangular secondary battery 20 will be described.

Assembly of Sealing Body

Figure 3:
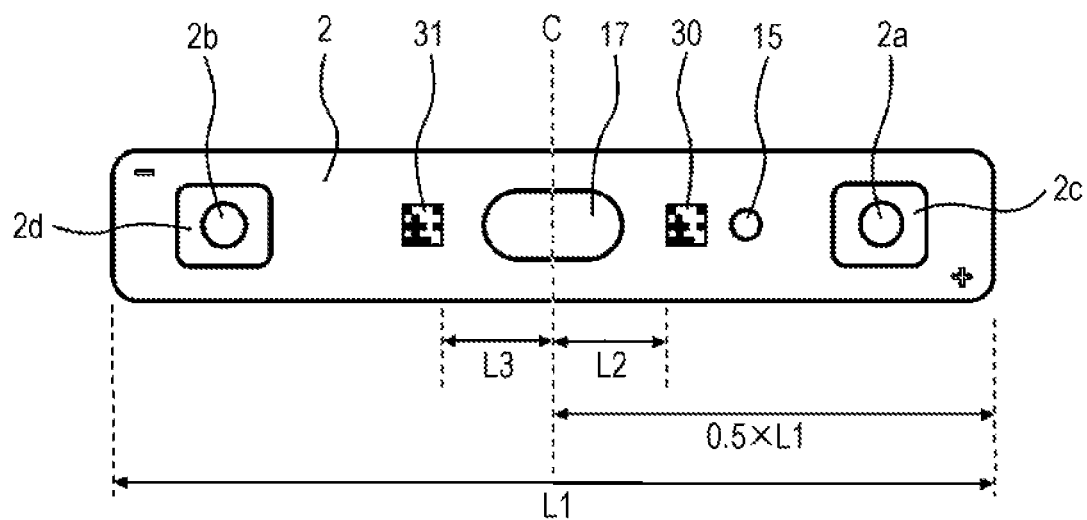
FIG. 3 is a top view of a sealing plate according to the embodiment.

FIG. 3 shows an upper surface (surface on the external side of the battery) of the sealing plate 2.

The length of the sealing plate 2 in the longitudinal direction is L1. In the longitudinal direction of the sealing plate 2, a straight line that is away from the one end portion of the sealing plate 2 by a distance of 0.5×L1 and that extends in the transverse direction of the sealing plate 2 is a center line C of the sealing plate 2. The gas exhaust valve 17 is arranged at the center portion of the sealing plate 2 in the longitudinal direction. In addition, the gas exhaust valve 17 includes a portion arranged on the center line C. In such a configuration, the gas exhaust valve 17 stably operates when the pressure inside the battery case 100 reaches the predetermined value. Moreover, it is possible to more smoothly exhaust the gas inside the battery case 100 through the gas exhaust valve 17 during operation of the gas exhaust valve 17. In the longitudinal direction of the sealing plate 2, the distance from the center line C of the sealing plate 2 to the first identification code 30 is L2, and the distance from the center line C of the sealing plate 2 to the second identification code 31 is L3.

The sealing plate 2 is provided with a first recessed portion 2c, and the positive-electrode-terminal attachment hole 2a is provided inside the first recessed portion 2c. In addition, the sealing plate 2 is provided with a second recessed portion 2d, and the negative-electrode-terminal attachment hole 2b is provided inside the second recessed portion 2d. Moreover, the sealing plate 2 is provided with a "+" mark in the vicinity of the positive-electrode-terminal attachment hole 2a and a "−" mark in the vicinity of the negative-electrode-terminal attachment hole 2b.

A method of attaching the positive electrode terminal 7 and the negative electrode terminal 9 to the sealing plate 2 will be described for the positive-electrode side as an example. Note that the same method as that for the positive-electrode side is applicable to the negative-electrode side.

Figure 4:
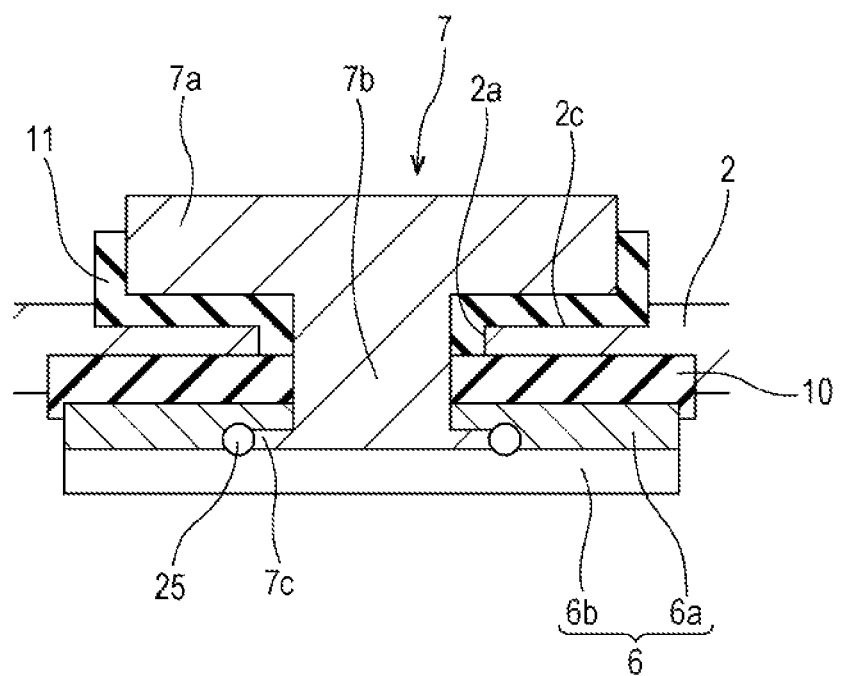
FIG. 4 is a sectional view taken along the longitudinal direction of the sealing plate in the vicinity of a positive electrode terminal.

As shown in FIG. 4, on the surface of the sealing plate 2 on the external side of the battery, the outside insulation member 11 is arranged around the positive-electrode-terminal attachment hole 2a. In addition, on the surface of the sealing plate 2 on the internal side of the battery, the Side insulation member 10 and the positive electrode current collector 6 are arranged around the positive-electrode-terminal attachment hole 2a. In addition, the insertion portion 7b of the positive electrode terminal 7 is inserted into the through hole of the outside insulation member 11, the positive-electrode-terminal attachment hole 2a of the sealing plate 2, the through hole of the Side insulation member 10, and the through hole of the positive electrode current collector 6. Then, the leading end portion of the insertion portion 7b of the positive electrode terminal 7 is caulked on the positive electrode current collector 6, and a caulked portion 7c is thereby formed. Consequently, the positive electrode terminal 7 and the positive electrode current collector 6 are attached to the sealing plate 2. Preferably, the caulked portion 7c and the positive electrode current collector 6 are welded and coupled to each other to form a welded portion 25. Note that the flange portion 7a of the positive electrode terminal 7 is arranged closer than the sealing plate 2 to the external side of the battery. Meanwhile, the outside insulation member 11 is arranged inside the first recessed portion 2c. The positive electrode current collector 6 includes a base portion 6a and a tab coupling portion 6b. The positive electrode terminal 7 is coupled to the base portion 6a, and the positive electrode tab 4 is coupled to the tab coupling portion 6b. A plate subjected to a bending process is usable as the positive electrode current collector 6.

Figure 5A:
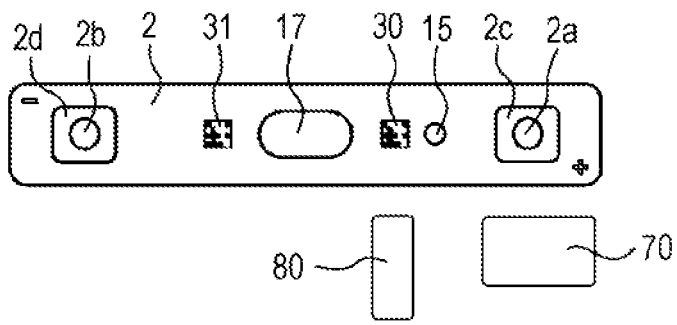
FIGS. 5A, 5B, 5C, and 5D show processes of attaching the positive electrode terminal and a negative electrode terminal to the sealing plate.
Figure 5B:
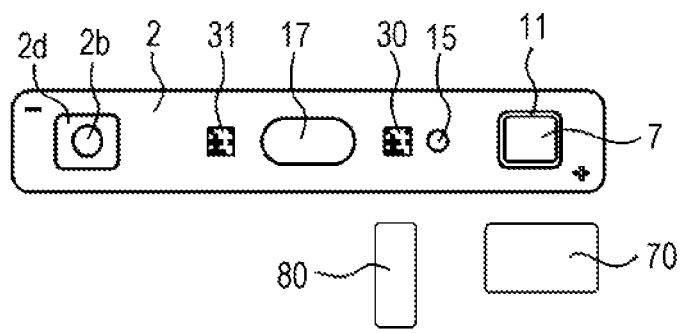

FIGS. 5A, 5B, 5C, and 5D show processes of attaching the positive electrode terminal 7 and the negative electrode terminal 9 to the sealing plate 2. As shown in FIG. 5A, the positive-electrode-terminal attachment hole 2a of the sealing plate 2 is arranged on the side where a terminal attaching apparatus 70 is present. Then, the first identification code 30 is read with an identification code reader 80. Next, as shown in FIG. 5B, the positive electrode terminal 7 is attached to the positive-electrode-terminal attachment hole 2a by the terminal attaching apparatus 70. At this time, the positive electrode terminal 7 and the positive electrode current collector 6 are coupled to each other. Note that the terminal attaching apparatus 70 includes a caulking device that caulks the leading end portion of the insertion portion 7b of the positive electrode terminal 7 and a laser welding device that welds using laser the caulked portion 7c of the positive electrode terminal 7 and the positive electrode current collector 6 to each other. Note that the terminal attaching apparatus 70 may include only one of the caulking device and the laser welding device.

Figure 5C:
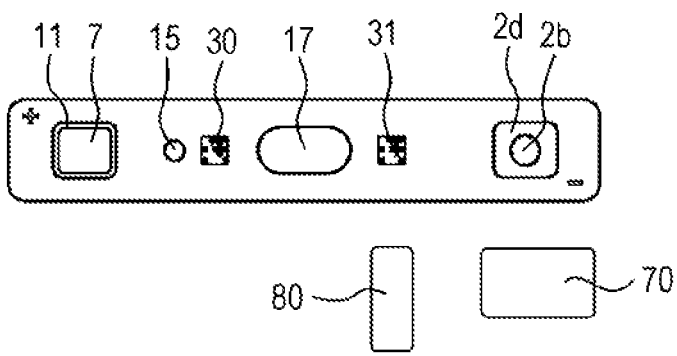

Next, as shown in FIG. 5C, the sealing plate 2 is turned 180 degrees to arrange the negative-electrode-terminal attachment hole 2b of the sealing plate 2 on the side where the terminal attaching apparatus 70 is present. Then, the first identification code 30 is read with the identification code reader 80.

Figure 5D:
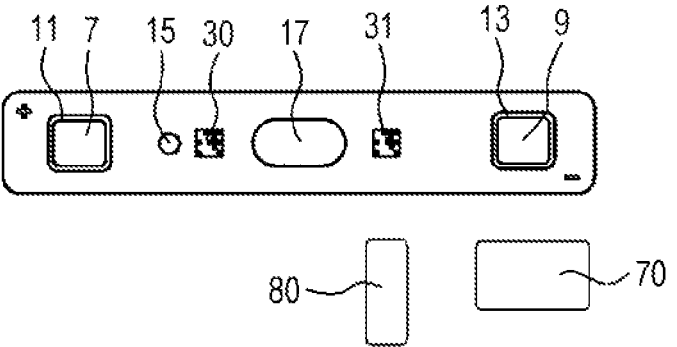

Next, as shown in FIG. 5D, the negative electrode terminal 9 is attached to the negative-electrode-terminal attachment hole 2b by the terminal attaching apparatus 70. At this time, the negative electrode terminal 9 and the negative electrode current collector 8 are coupled to each other.

Consequently, the positive electrode terminal 7 and the negative electrode terminal 9 are attached to the sealing plate 2.

Attachment of Electrode Body to Sealing Plate

The positive electrode tab 4 of the electrode body 3 is welded and coupled to the positive electrode current collector 6 attached to the sealing plate 2. In addition, the negative electrode tab 5 of the electrode body 3 is welded and coupled to the negative electrode current collector 8 attached to the sealing plate 2.

Assembly of Rectangular Secondary Battery

The electrode body 3 is covered with the insulation sheet 14 made of resin and is inserted into the rectangular outer packaging body 1. In addition, the sealing plate 2 and the rectangular outer packaging body 1 are welded and coupled to each other, and the opening of the rectangular outer packaging body 1 is sealed with the sealing plate 2. Then, a non-aqueous electrolytic solution that contains an electrolyte salt and an electrolyte solvent is injected through the liquid injection hole 15 provided in the sealing plate 2. Consequently, the rectangular secondary battery 20 is completed by sealing the liquid injection hole with the sealing plug 16.

The rectangular secondary battery 20 is provided with the first identification code 30 and the second identification code 31, which include the identical information, on one side and the other side of the gas exhaust valve 17, respectively, in the longitudinal direction of the sealing plate 2. Therefore, there is no need to move the terminal attaching apparatus 70 and the identification code reader 80 in a process of attaching the positive electrode terminal 7 and the negative electrode terminal 9 to the sealing plate 2. In contrast, if only one identification code is provided on the sealing plate, there is a need to move the terminal attaching apparatus 70 or the identification code reader 80. Thus, in the configuration of the rectangular secondary battery 20, the productivity is further improved in the secondary battery.

The length of the sealing plate 2 in the longitudinal direction of the sealing plate 2 is L1. Preferably, in the longitudinal direction of the sealing plate 2, the first identification code 30 is arranged at a position away from the one end portion of the sealing plate 2 to the other end portion of the sealing plate 2 by a distance of 0 to 0.45×L1. In addition, preferably, in the longitudinal direction of the sealing plate 2, the second identification code 31 is arranged at a position away from the one end portion of the sealing plate 2 to the other end portion of the sealing plate 2 by a distance of 0.55×L1 to L1.

More preferably, in the longitudinal direction of the sealing plate 2, the first identification code 30 is arranged at a position away from the one end portion of the sealing plate 2 to the other end portion of the sealing plate 2 by a distance of 0.25×L1 to 0.45×L1. In addition, more preferably, in the longitudinal direction of the sealing plate 2, the second identification code 31 is arranged at a position away from the one end portion of the sealing plate 2 to the other end portion of the sealing plate 2 by a distance of 0.55×L1 to 0.75×L1.

Preferably, in the longitudinal direction of the sealing plate 2, the first identification code 30 is arranged between the positive electrode terminal 7 and the gas exhaust valve 17, and the second identification code 31 is arranged between the negative electrode terminal 9 and the gas exhaust valve 17.

Assembled Battery

Figure 6:
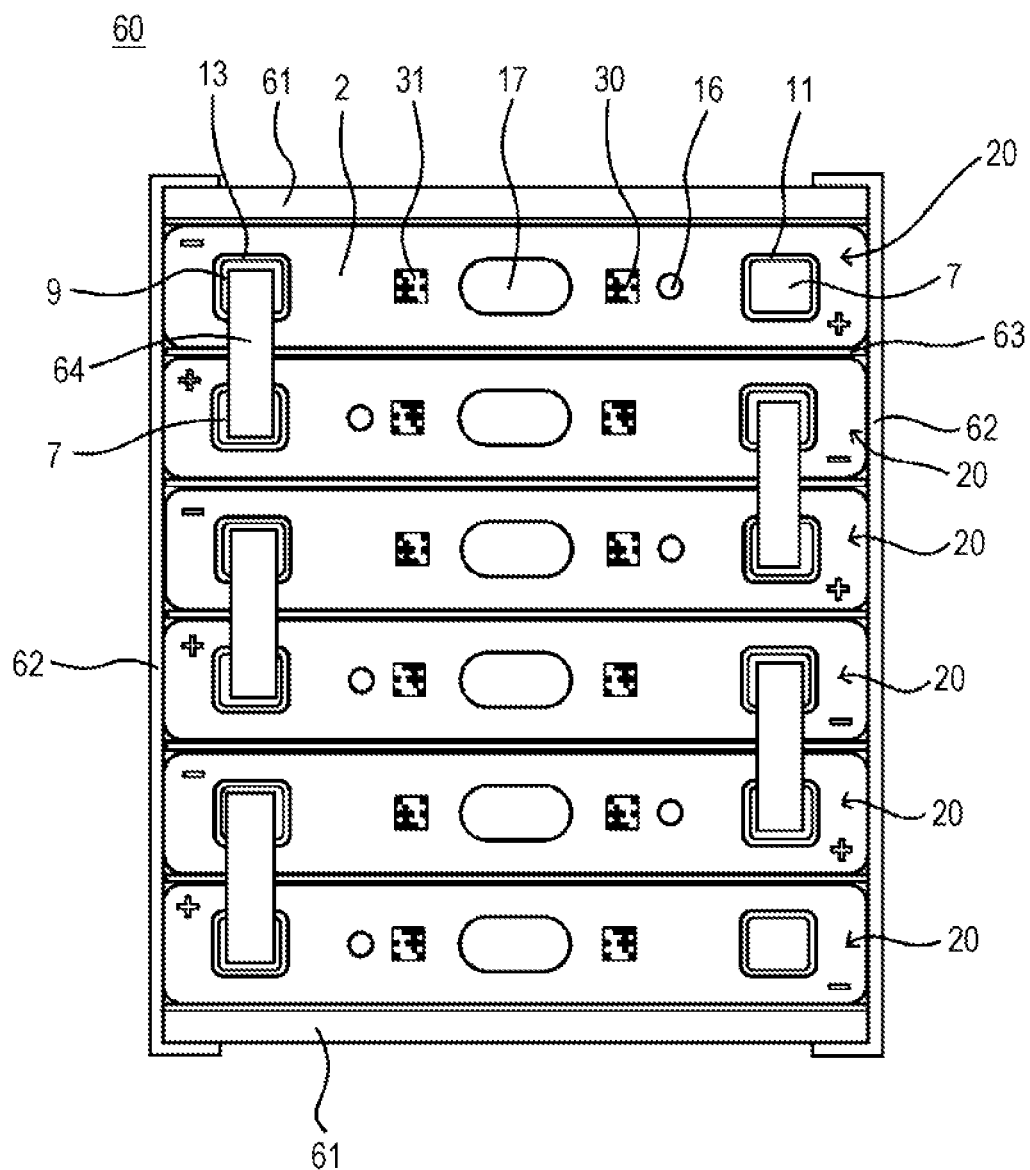
FIG. 6 is a top view of an assembled battery according to an embodiment.

It is possible to manufacture an assembled battery by using a plurality of the rectangular secondary batteries 20 according to the aforementioned embodiment. FIG. 6 is a top view of an assembled battery 60 according to an embodiment. The assembled battery 60 includes six units of the rectangular secondary batteries 20 arranged between a pair of end plates 61 made of metal. The pair of end plates 61 are coupled to each other by binding bars 62 made of metal. The rectangular secondary batteries 20 are stacked on each other via an insulation spacer 63 made of resin. A resin sheet or the like is usable as the insulation spacer 63. Meanwhile, the positive electrode terminal 7 of each of the rectangular secondary batteries 20 is coupled to the negative electrode terminal 9 of the other rectangular secondary battery 20 adjacent thereto by a bus bar 64 made of metal. In the assembled battery 60, all of the rectangular secondary batteries 20 are directly coupled together and arranged so as to be alternately oriented.

In the assembled battery 60, the sealing plate 2 of each of the rectangular secondary batteries 20 is provided with the first identification code 30 and the second identification code 31, which includes the identical information. Therefore, in the state of the assembled battery 60, the identification codes, which include the identical information, are substantially aligned. Accordingly, it is possible to reduce the time required to read the information of each of the rectangular secondary batteries 20 that constitute the assembled battery 60.

In the assembled battery 60, all of the rectangular secondary batteries 20 are coupled together in series, and thus, in the stacking direction of the rectangular secondary batteries 20, the rectangular secondary batteries 20 are alternately oriented. It is also possible to configure the assembled battery such that a plurality of rectangular secondary batteries are coupled in parallel and the rectangular secondary batteries coupled in parallel are coupled in series. In this case, preferably, the rectangular secondary batteries coupled in parallel are arranged in an identical orientation.

Figure 7:
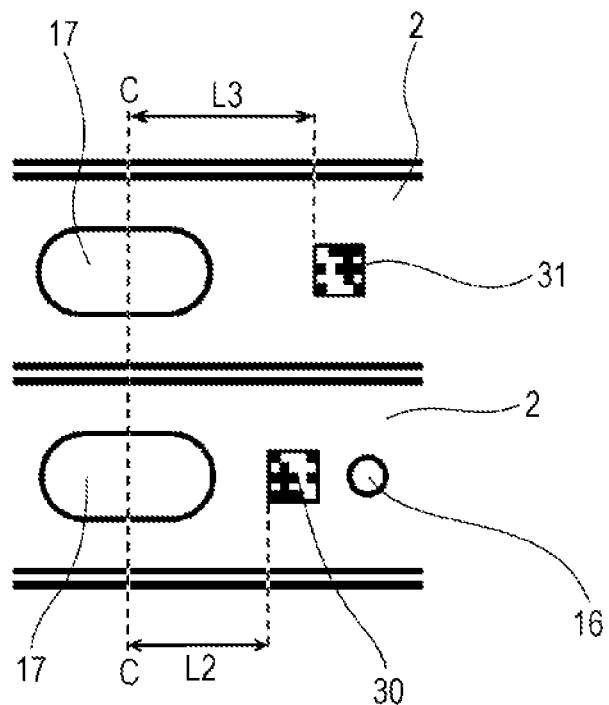
FIG. 7 is an enlarged view of the vicinity of gas exhaust valves of two rectangular secondary batteries adjacent to each other in the assembled battery.

The distance L2 from the center line C of the sealing plate 2 to the first identification code 30 and the distance L3 from the center line C of the sealing plate 2 to the second identification code 31 may not necessarily be identical to each other. As shown in FIG. 7, the distance L2 from the center line C of the sealing plate 2 to the first identification code 30 and the distance L3 from the center line C of the sealing plate 2 to the second identification code 31 may be different from each other. A value of L2/L3 is preferably 0.5 to 2.0 and, more preferably, 0.67 to 1.5.

First Modification

Figure 8:
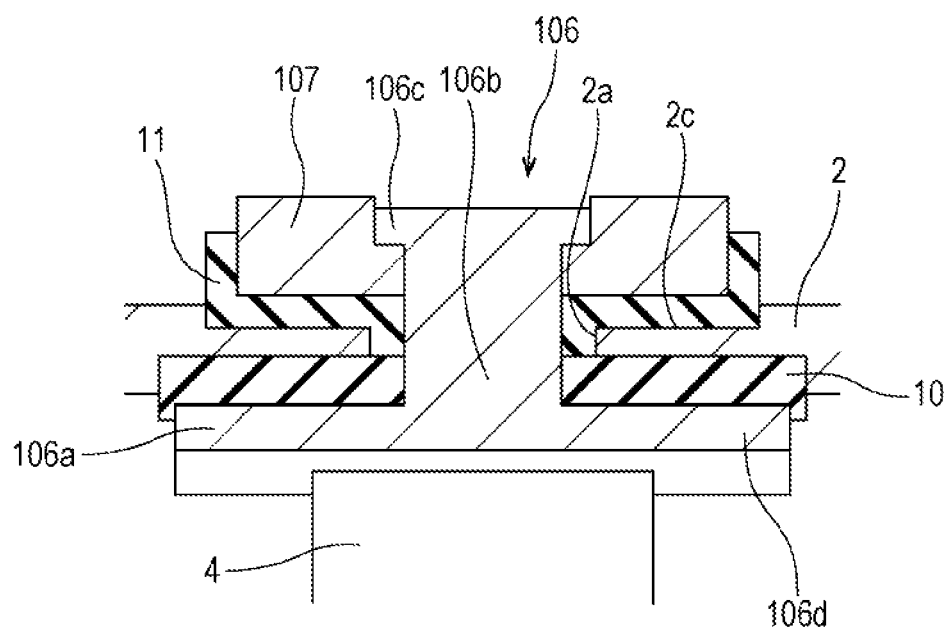
FIG. 8 is a sectional view taken along the longitudinal direction of a rectangular secondary battery according to a first modification in the vicinity of a positive electrode terminal.

A rectangular secondary battery according to a first modification differs from the rectangular secondary battery 20 according to the aforementioned embodiment in terms of the method of attaching the positive electrode terminal and the negative electrode terminal to the sealing plate. A method of attaching the positive electrode terminal and the negative electrode terminal to the sealing plate of the rectangular secondary battery according the first modification will be described for the positive-electrode side as an example with reference to FIG. 8.

A positive electrode terminal 106 that includes a flange portion 106a and an insertion portion 106b is used. On the surface of the sealing plate 2 on the external side of the battery, the outside insulation member 11 and an external conductive member 107 are arranged around the positive-electrode-terminal attachment hole 2a. On the surface of the sealing plate 2 on the internal side of the battery, the inside insulation member 10 is arranged around the positive-electrode-terminal attachment hole 2a. In addition, the insertion portion 106b of the positive electrode terminal 106 is inserted from the internal side of the battery into the through hole of the inside insulation member 10, the positive-electrode-terminal attachment hole 2a of the sealing plate 2, the through hole of the outside insulation member 11, and a through hole of the external conductive member 107. Then, the leading end portion of the insertion portion 106b is caulked to form a caulked portion 106c. Consequently, the positive electrode terminal 106 and the external conductive member 107 are attached to the sealing plate 2. The caulked portion 106c may be welded and coupled to the external conductive member 107. The positive electrode terminal 106 includes a tab coupling portion 106d, and the positive electrode tab 4 is welded and coupled to the tab coupling portion 106d.

Second Modification

Figure 9:
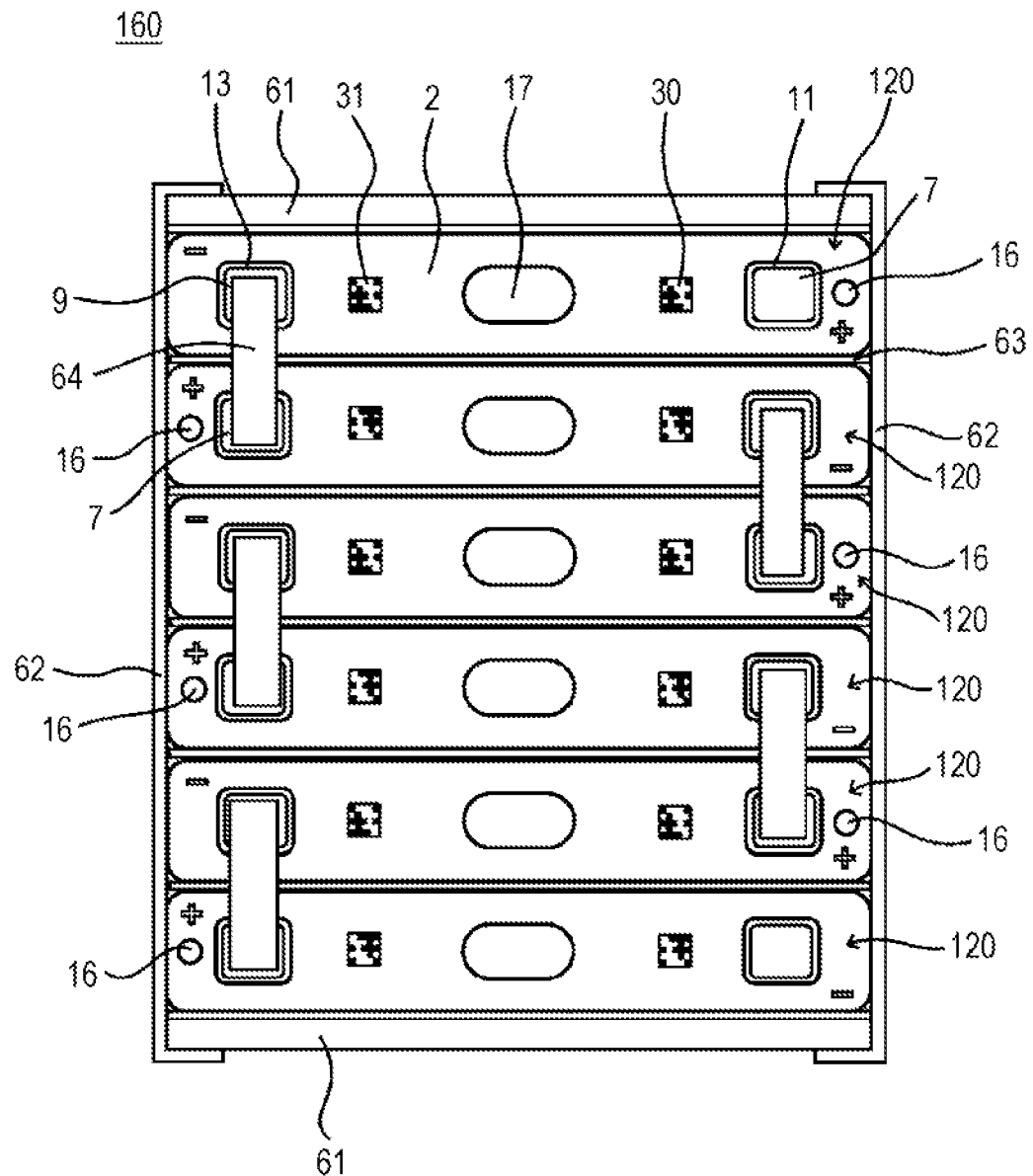
FIG. 9 is a top view of an assembled battery according to a second modification.

FIG. 9 is a top view of rectangular secondary batteries 120 and an assembled battery 160 according to a second modification. The rectangular secondary batteries 120 according to the second modification differ from the rectangular secondary battery 20 according to the aforementioned embodiment in terms of the configuration of the sealing plate. In each of the rectangular secondary batteries 120 according to the second modification, the liquid injection hole 15 and the sealing plug 16 that seals the liquid injection hole 15 are arranged closer to the outside (closer to an end portion of the sealing plate 2) than the positive electrode terminal 7 in the longitudinal direction of the sealing plate 2. In such a configuration, a position at which the first identification code 30 is provided is not limited due to the liquid injection hole 15 and the sealing plug 16. Accordingly, it becomes easier to linearly arrange the first identification code 30 and the second identification code 31 on the assembled battery 160. The liquid injection hole 15 and the sealing plug 16 that seals the liquid injection hole 15 may be arranged closer to the outside (closer to an end portion of the sealing plate 2) than the negative electrode terminal 9 in the longitudinal direction of the sealing plate 2.

Third Modification

Figure 10:
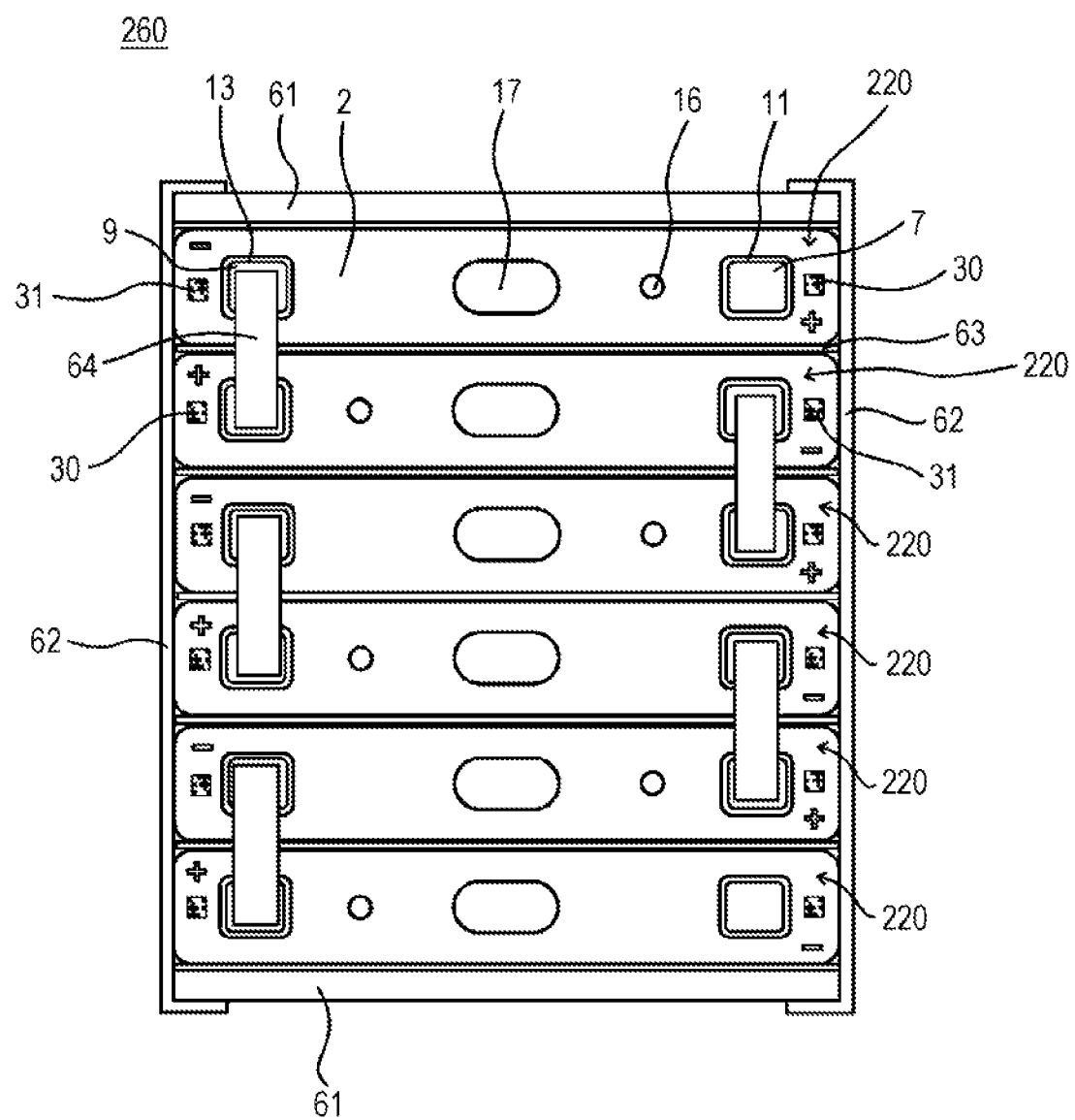
FIG. 10 is a top view of an assembled battery according to a third modification.

FIG. 10 is a top view of rectangular secondary batteries 220 and an assembled battery 260 according to a third modification. The rectangular secondary batteries 220 according to the third modification differ from the rectangular secondary battery 20 according to the aforementioned embodiment in terms of the configuration of the sealing plate. In each of the rectangular secondary batteries 220 according to the third modification, the first identification code 30 is arranged closer to the outside (closer to an end portion of the sealing plate 2) than the positive electrode terminal 7 in the longitudinal direction of the sealing plate 2. In addition, the second identification code 31 is arranged closer to the outside (closer to an end portion of the sealing plate 2) than the negative electrode terminal 9 in the longitudinal direction of the sealing plate 2. In such a configuration, it becomes easier to linearly arrange the first identification code 30 and the second identification code 31 on the assembled battery 260. Moreover, it is possible to provide the first identification code 30 and the second identification code 31 at positions away from the gas exhaust valve 17 and the liquid injection hole 15. Therefore, it is possible to suppress with certainty occurrence of damage of the first identification code 30 or the second identification code 31 due to the operation of the gas exhaust valve 17 and occurrence of damage of the first identification code 30 or the second identification code 31 due to the electrolytic solution that has seeped out from the liquid injection hole 15.

Second Disclosure

A rectangular secondary battery according to a second disclosure includes a rectangular outer packaging body that has an opening; a sealing plate that seals the opening; and an electrode body that is arranged Side the rectangular outer packaging body and that includes a positive electrode plate and a negative electrode plate. The length of the sealing plate in the longitudinal direction is more than or equal to three times the length of the sealing plate in the transvers direction. The length of the sealing plate in the transverse direction is 5 cm or less. The sealing plate is provided with a gas exhaust valve. At least a portion of the gas exhaust valve is arranged at the center of the sealing plate in the longitudinal direction of the sealing plate. In the transverse direction of the sealing plate, an identification code is arranged between an end portion of the sealing plate and the gas exhaust valve.

Figure 11:
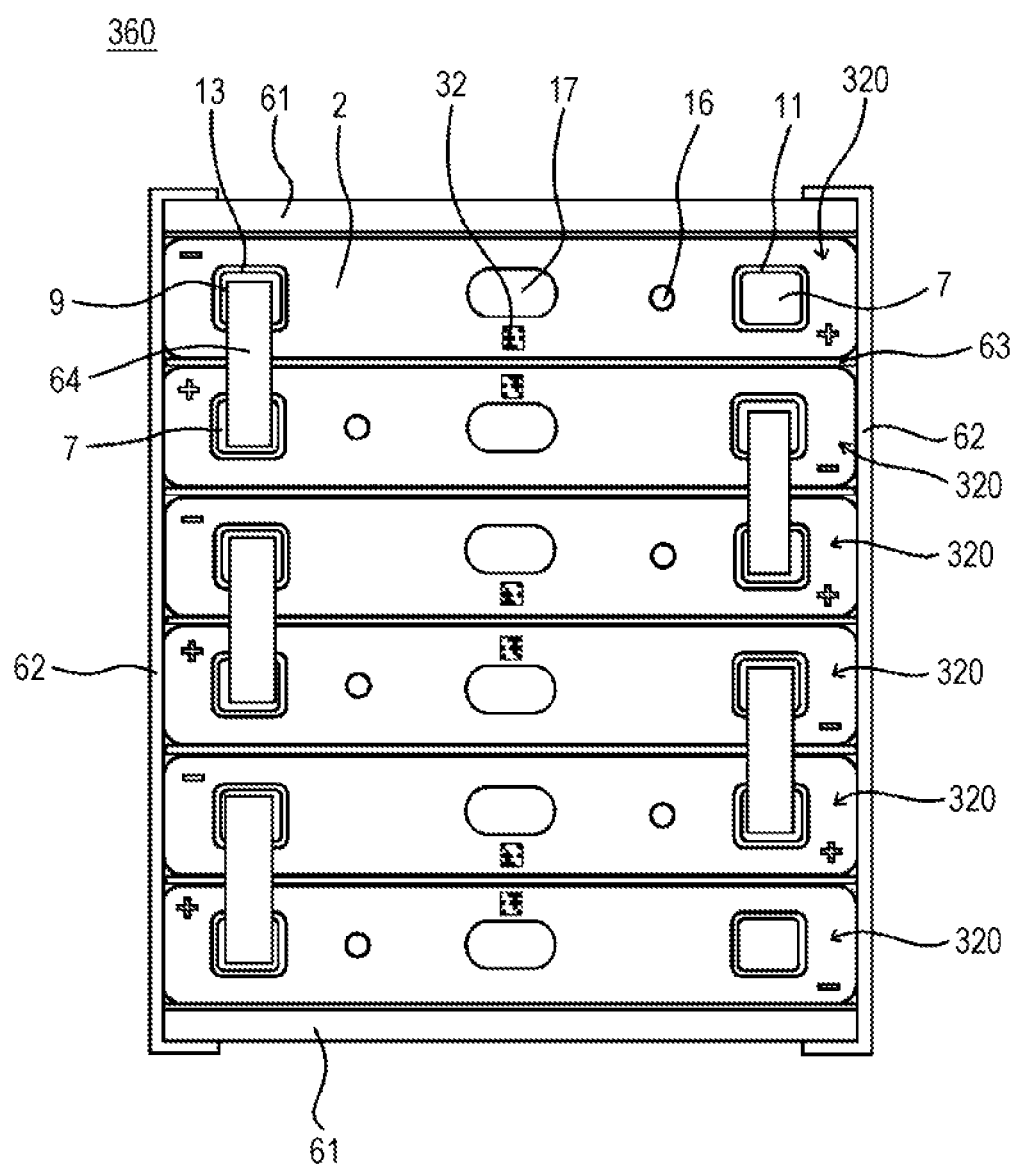
FIG. 11 is a top view of an assembled battery according a first other mode.

FIG. 11 is a top view of rectangular secondary batteries 320 and an assembled battery 360 according to the second disclosure. The rectangular secondary batteries 320 according to the second disclosure differ from the rectangular secondary battery 20 according to the aforementioned embodiment in terms of the positions at which the identification codes are provided. Note that each of the rectangular secondary batteries 320 according to the second disclosure is not necessarily provided, on one sealing plate, with two identification codes that have identical information. In each of the rectangular secondary batteries 320 according to the second disclosure, an identification code 32 is arranged on the sealing plate 2 so as to be between a long side that constitutes the outer peripheral edge of the sealing plate 2 and the gas exhaust valve 17. That is, the gas exhaust valve 17 and the identification code 32 are arranged adjacent to each other in the transverse direction of the sealing plate 2. Therefore, in the assembled battery 360, the identification codes that have identical information are substantially aligned. Accordingly, it is possible to reduce the time required to read the information of each of the rectangular secondary batteries 320 that constitute the assembled battery 360.

Third Disclosure

A rectangular secondary battery according to a third disclosure includes a rectangular outer packaging body that has an opening; a sealing plate that seals the opening; and an electrode body that is arranged inside the rectangular outer packaging body and that includes a positive electrode plate and a negative electrode plate. A gas exhaust valve is formed at a position away from the center of the sealing plate in the longitudinal direction, and an identification code is formed in the vicinity of the center of the sealing plate in the longitudinal direction.

The length of the sealing plate in the longitudinal direction of the sealing plate is L1. Preferably, in the longitudinal direction of the sealing plate, at least a portion of the identification code is arranged in a region away from one end portion of the sealing plate to the other end portion thereof by a distance of $0.4 \times L1$ to $0.6 \times L1$. In addition, preferably, in the longitudinal direction of the sealing plate, the gas exhaust valve is arranged in a region away from the one end portion of the sealing plate to the other end portion thereof by a distance of $0$ to $0.4 \times L1$ or in a region away from the one end portion of the sealing plate to the other end portion thereof by a distance of $0.6 \times L1$ to $L1$.

Figure 12:
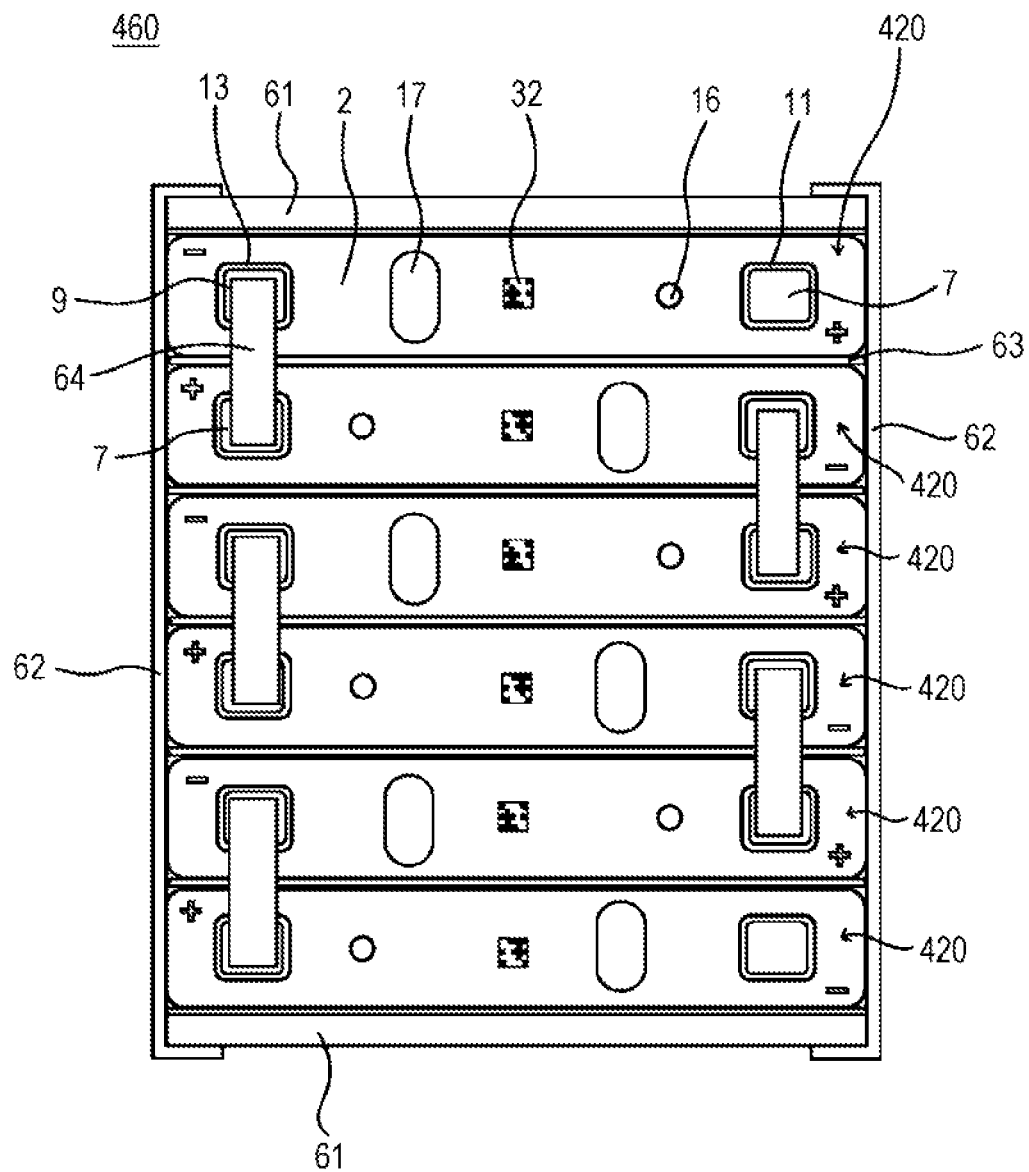
FIG. 12 is a top view of an assembled battery according to a second other mode.

FIG. 12 is a top view of rectangular secondary batteries 420 and an assembled battery 460 according to the third disclosure. The rectangular secondary batteries 420 according to the third disclosure differ from the rectangular secondary battery 20 according to the aforementioned embodiment in terms of the positions at which the gas exhaust valve and the identification codes are provided. Note that each of the rectangular secondary batteries 420 according to the third disclosure is not necessarily provided, on one sealing plate, with two identification codes that have identical information.

In each of the rectangular secondary batteries 420 according to the third disclosure, the gas exhaust valve 17 is provided, on the sealing plate 2, at a position away from the center of the sealing plate 2 in the longitudinal direction. In addition, the identification code 32 is provided at the center portion of the sealing plate 2 in the longitudinal direction. Therefore, in the assembled battery 460, the identification codes that have identical information are substantially aligned. Accordingly, it is possible to reduce the time required to read the information of each of the rectangular secondary batteries 420 that constitute the assembled battery 460.

Preferably, in the third disclosure, the gas exhaust valve 17 is formed at a position that does not overlap the center line C of the sealing plate 2. The distance between the center line C of the sealing plate 2 and the identification code 32 is preferably 2 cm or less and, more preferably, 1 cm or less. Further more preferably, the identification code 32 is arranged at a position where at least a portion of the identification code 32 overlaps the center line C of the sealing plate 2.

Fourth Disclosure

A rectangular secondary battery according to a fourth disclosure includes a rectangular outer packaging body that has an opening; a sealing plate that seals the opening; and an electrode body that is arranged inside the rectangular outer packaging body and that includes a positive electrode plate and a negative electrode plate. The sealing plate is provided with an identification code, a liquid injection hole, and a gas exhaust valve. In the longitudinal direction of the sealing plate, one of the identification code and the liquid injection hole is arranged closer than the positive electrode terminal to the outside, the other one of the identification code and the liquid injection hole is arranged closer than the negative electrode terminal to the outside, and the gas exhaust valve is provided between the positive electrode terminal and the negative electrode terminal.

Figure 13:
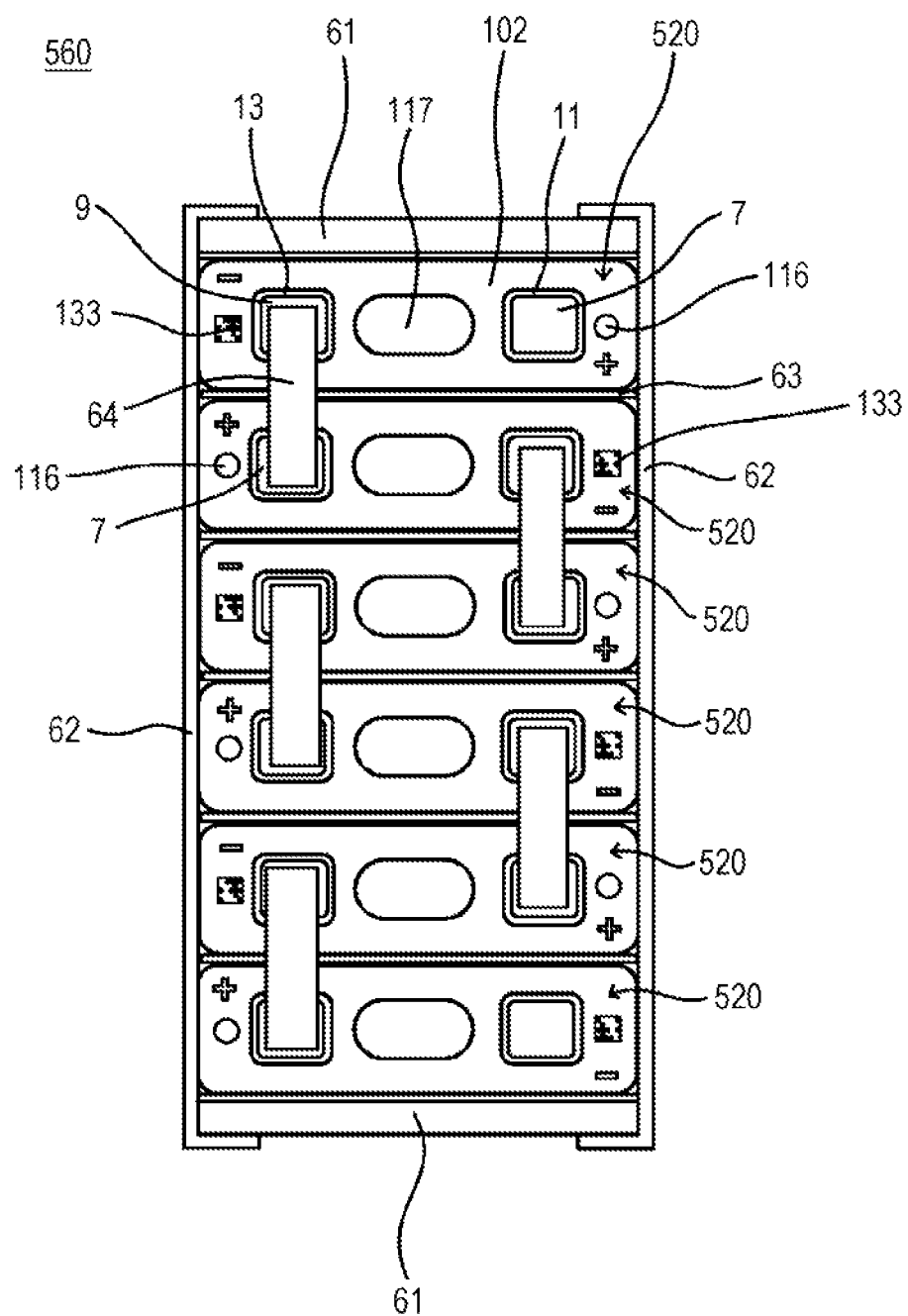
FIG. 13 is a top view of an assembled battery according to a third other mode.

FIG. 13 is a top view of rectangular secondary batteries 520 and an assembled battery 560 according to a fourth disclosure. The rectangular secondary batteries 520 according to the fourth disclosure differ from the rectangular secondary battery 20 according to the aforementioned embodiment in terms of the size of the sealing plate and the positions at which the liquid injection hole and the identification codes are provided. Note that each of the rectangular secondary batteries 520 according to the fourth disclosure is not necessarily provided, on one sealing plate, with two identification codes that have identical information.

In each of the rectangular secondary batteries 520 according to the fourth disclosure, the liquid injection hole is arranged closer than the positive electrode terminal 7 to the outside in the longitudinal direction of a sealing plate 102. The liquid injection hole is sealed with a sealing plug 116. In the longitudinal direction of the sealing plate 102, an identification code 133 is arranged closer than the negative electrode terminal 9 to the outside. In addition, a gas exhaust valve 117 is arranged between the positive electrode terminal 7 and the negative electrode terminal 9. Therefore, it is possible to suppress with certainty occurrence of damage of the identification code 133 due to the operation of the gas exhaust valve 117 and occurrence of damage of the identification code 133 due to the electrolytic solution that has seeped out from the liquid injection hole.

In the assembled battery 560, a plurality of rectangular secondary batteries 520 are stacked on each other via the insulation spacer 63 and arranged between the pair of end plates 61. The pair of end plates 61 are coupled to each other by the binding bars 62. The positive electrode terminal 7 of one of the rectangular secondary batteries 520 adjacent to each other and the negative electrode terminal 9 of the other rectangular secondary battery 520 thereof are coupled to each other by the bus bar 64.

Other Modes

The type of the identification code is not particularly limited; however, preferably, the identification code is a two-dimensional code. In addition, the method of forming the identification codes is not particularly limited. It is possible to directly provide the identification code or the like on a sealing plate made of metal by using, for example, a laser marker. In addition, the identification code or the like may be printed on the sealing plate by using, for example, a coating material. Moreover, a separate member provided with an identification code may be stuck on the sealing plate.

Publicly known materials are usable for the positive electrode plate, the negative electrode plate, the separator, the electrolytic solution, and the like. In addition, a current breaker mechanism or a short-circuit mechanism that operates when the pressure inside the battery case is more than or equal to a predetermined value may be provided. The electrode body may be a stacked electrode body or may be a wound electrode body.

It is possible to use, as the gas exhaust valve provided in the sealing plate, a gas exhaust valve integral with the sealing plate, which is formed by subjecting the sealing plate to press processing. In addition, it is also possible to weld and couple a gas exhaust valve that is constituted by a separate component from the sealing plate to the sealing plate so as to close a through hole provided in the sealing plate.

While detailed embodiments have been used to illustrate the present invention, to those skilled in the art, however, it will be apparent from the foregoing disclosure that various changes and modifications can be made therein without departing from the spirit and scope of the invention. Furthermore, the foregoing description of the embodiments according to the present invention is provided for illustration only, and is not intended to limit the invention.

What is claimed is:

1. An assembled battery comprising: a plurality of rectangular secondary batteries stacked wherein each of the plurality of rectangular secondary batteries comprising:

a rectangular outer packaging body that has an opening;

a sealing plate that seals the opening; and an electrode body that is arranged inside the rectangular outer packaging body and that includes a positive electrode plate and a negative electrode plate, wherein a length of the sealing plate in the longitudinal direction of the sealing plate is L1, and wherein, in a longitudinal direction of the sealing plate, a first identification code is provided between one end portion of the sealing plate and a position away from the one end portion of the sealing plate to the other end portion of the sealing plate by a distance of 0.5×L1, wherein, in the longitudinal direction of the sealing plate, a second identification code is provided between an other end portion of the sealing plate and the position away from the one end portion of the sealing plate to the other end portion of the sealing plate by a distance of 0.5×L1, and wherein the first identification code and the second identification code include identical information, wherein a positive electrode terminal that is electrically coupled to the positive electrode plate and a negative electrode terminal that is electrically coupled to the negative electrode plate are attached to the sealing plate, and wherein, in the longitudinal direction of the sealing plate, the positive electrode terminal is arranged between the one end portion of the sealing plate and the position away from the one end portion of the sealing plate to the other end portion of the sealing plate by a distance of 0.5×L1, and the negative electrode terminal is arranged between the other end portion of the sealing plate and the position away from the one end portion of the sealing plate to the other end portion of the sealing plate by a distance of 0.5×L1, and wherein a first rectangular secondary battery and a second rectangular secondary battery in the plurality of rectangular secondary batteries are adjacent to each other, wherein the positive electrode terminal of the first rectangular secondary battery and the negative electrode terminal of the second rectangular secondary battery are adjacent to each other in a direction where the plurality of rectangular secondary batteries are stacked, wherein the first identification code of the first rectangular secondary battery and the second identification code of the second rectangular secondary battery are adjacent to each other in a direction where the plurality of rectangular secondary batteries are stacked.

2. The assembled battery according to claim 1,
wherein the sealing plate is provided with a gas exhaust valve,
wherein, in a longitudinal direction of the sealing plate, the first identification code is provided closer than the gas exhaust valve to one end portion of the sealing plate,
wherein, in the longitudinal direction of the sealing plate, the second identification code is provided closer than the gas exhaust valve to the other end portion of the sealing plate.

3. The assembled battery according to claim 2,
wherein, in the longitudinal direction of the sealing plate, at least a portion of the gas exhaust valve is arranged at a position away from the one end portion of the sealing plate to the other end portion of the sealing plate by a distance of 0.5×L1.

4. The assembled battery according to claim 3,
wherein, in the longitudinal direction of the sealing plate, the first identification code is arranged at a position away from the one end portion of the sealing plate to the other end portion of the sealing plate by a distance of 0 to 0.45×L1, and
wherein, in the longitudinal direction of the sealing plate, the second identification code is arranged at a position away from the one end portion of the sealing plate to the other end portion of the sealing plate by a distance of 0.55×L1 to L1.

5. The assembled battery according to claim 4,
wherein, in the longitudinal direction of the sealing plate, the first identification code is arranged at a position away from the one end portion of the sealing plate to the other end portion of the sealing plate by a distance of 0.25×L1 to 0.45×L1, and
wherein, in the longitudinal direction of the sealing plate, the second identification code is arranged at a position away from the one end portion of the sealing plate to the other end portion of the sealing plate by a distance of 0.55×L1 to 0.75×L1.

* * * * *